(12) United States Patent
Okuda et al.

(10) Patent No.: US 11,872,789 B2
(45) Date of Patent: Jan. 16, 2024

(54) DECORATIVE FILM FOR INSERT MOLDING, METHOD FOR MANUFACTURING DECORATIVE FILM FOR INSERT MOLDING, AND METHOD FOR MANUFACTURING RESIN MOLDED PRODUCT

(71) Applicant: NISSHA CO., LTD., Kyoto (JP)

(72) Inventors: Michiyasu Okuda, Kyoto (JP); Yusuke Ueno, Kyoto (JP); Shintaro Kuwasaka, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 18/258,321

(22) PCT Filed: Dec. 2, 2021

(86) PCT No.: PCT/JP2021/044317
§ 371 (c)(1),
(2) Date: Jun. 19, 2023

(87) PCT Pub. No.: WO2022/138052
PCT Pub. Date: Jun. 30, 2022

(65) Prior Publication Data
US 2023/0405984 A1    Dec. 21, 2023

(30) Foreign Application Priority Data
Dec. 21, 2020   (JP) .................. 2020-211219

(51) Int. Cl.
*B32B 27/36* (2006.01)
*B29C 45/14* (2006.01)
*B32B 27/30* (2006.01)

(52) U.S. Cl.
CPC ........ *B32B 27/36* (2013.01); *B29C 45/14008* (2013.01); *B32B 27/30* (2013.01)

(58) Field of Classification Search
CPC .............................. B32B 27/36; B32B 27/30
See application file for complete search history.

(56) References Cited

FOREIGN PATENT DOCUMENTS

| JP | 2008080570 A | 4/2008 |
|---|---|---|
| JP | 2016203577 A | 12/2016 |

(Continued)

OTHER PUBLICATIONS

English machine translation for JP2016-203577. (Year: 2016).*

(Continued)

*Primary Examiner* — Michael C Miggins
(74) *Attorney, Agent, or Firm* — Alleman Hall Creasman & Tuttle LLP

(57) ABSTRACT

A decorative film for insert molding includes a gravure-printed graphic layer and a light-transmissive patterned layer with high dimensional accuracy and has a reduced flow of gravure ink in manufacturing of a polycarbonate resin molded product. A multilayer film transmissive to visible light includes two acrylic resin layers and a first polycarbonate resin layer containing a polycarbonate-based resin and located between the acrylic resin layers. The gravure print layer includes a graphic layer with a gravure-printed graphic element. A first backer film contains an acrylonitrile butadiene styrene-based (ABS-based) resin transmissive to visible light. A second backer film includes two additional resin layers and a second polycarbonate resin layer located between the two additional acrylic resin layers. A light-transmissive patterned layer is located to allow visible light to pass through a predetermined portion in the graphic layer.

9 Claims, 13 Drawing Sheets

(56) References Cited

FOREIGN PATENT DOCUMENTS

| | | | |
|---|---|---|---|
| JP | 2017170801 | A | 9/2017 |
| JP | 2018058219 | A | 4/2018 |
| JP | 2020055151 | A | 4/2020 |

OTHER PUBLICATIONS

English machine translation for JP2018-58219. (Year: 2018).*
English machine translation for JP2017-170801 (Year: 2017).*
English machine translation for JP2020-055151 (Year: 2020).*

\* cited by examiner

DECORATIVE FILM FOR INSERT MOLDING, METHOD FOR MANUFACTURING DECORATIVE FILM FOR INSERT MOLDING, AND METHOD FOR MANUFACTURING RESIN MOLDED PRODUCT

TECHNICAL FIELD

The present invention relates to a decorative film for insert molding, a method for manufacturing a decorative film for insert molding, and a method for manufacturing a resin molded product, and more particularly, to a decorative film for insert molding having a gravure-printed decorative graphic element that is transmissive to visible light, a method for manufacturing a decorative film for insert molding, and a method for manufacturing a resin molded product.

BACKGROUND

As described in, for example, Patent Literature 1 (Japanese Unexamined Patent Application Publication No. 2008-80570), a known decorative film for insert molding may include, on its surface, a film of methyl methacrylate resin or polymethyl methacrylate (PMMA) having a printed decorative graphic element. A known decorative film for insert molding may include a backer layer of acrylonitrile butadiene styrene-based (ABS-based) resin in a manner integral with the PMMA film to retain shape.

CITATION LIST

Patent Literature

Patent Literature 1: Japanese Unexamined Patent Application Publication No. 2008-80570

BRIEF SUMMARY

Technical Problem

For a PMMA film with a graphic element printed by gravure printing, the film can expand or shrink during the drying process in gravure printing. For a PMMA film that uses gravure printing to form a graphic layer and to form a light-transmissive patterned layer transmissive to visible light in alignment with the graphic layer, the PMMA film can expand or shrink during the drying process in gravure printing and lower the dimensional accuracy of these layers.

A decorative film for insert molding including a backer layer of ABS-based resin may be used for manufacturing a polycarbonate resin molded product. In this film, the backer layer of ABS-based resin with low heat resistance may not sufficiently prevent heat and pressure during injection molding from affecting a gravure print layer. In the decorative film for insert molding including the backer layer of ABS-based resin, the gravure ink may flow in the gravure print layer.

One or more aspects of the present invention are directed to a decorative film for insert molding including a gravure-printed graphic layer and a light-transmissive patterned layer with high dimensional accuracy and having less flow of gravure ink in manufacturing of a polycarbonate resin molded product.

Solution to Problem

In response to the above issue, aspects of the present invention are described below. Any of these aspects may be combined as appropriate.

A decorative film according to an aspect of the present invention is a decorative film for insert molding to be formed in a three-dimensional shape before insert molding. The decorative film includes a multilayer film, a gravure print layer, a first backer film, a second backer film, and a light-transmissive patterned layer. The multilayer film has a first main surface and a second main surface and includes a first acrylic resin layer containing an acrylic-based resin, a second acrylic resin layer containing an acrylic-based resin, and a first polycarbonate resin layer between the first acrylic resin layer and the second acrylic resin layer. The first polycarbonate resin layer contains a polycarbonate-based resin. The multilayer film is transmissive to visible light. The gravure print layer is located on the first main surface of the multilayer film and includes a graphic layer including a gravure-printed graphic element. The first backer film is located opposite to the multilayer film across the gravure print layer and contains an acrylonitrile butadiene styrene-based resin transmissive to visible light. The first backer film is transmissive to visible light. The second backer film is located opposite to the multilayer film across the first backer film and includes a third acrylic resin layer containing an acrylic-based resin, a fourth acrylic resin layer containing an acrylic-based resin, and a second polycarbonate resin layer between the third acrylic resin layer and the fourth acrylic resin layer. The second polycarbonate resin layer contains a polycarbonate-based resin. The second backer film is transmissive to visible light. The light-transmissive patterned layer includes a light-transmissive pattern being transmissive to visible light. The light-transmissive pattern in the light-transmissive patterned layer is located to allow visible light to pass through a predetermined portion of the graphic element in the graphic layer.

In the insert molding decorative film with this structure, the multilayer film includes the first acrylic resin layer, the second acrylic resin layer, and the first polycarbonate resin layer between the first acrylic resin layer and the second acrylic resin layer. The second backer film includes the third acrylic resin layer, the fourth acrylic resin layer, and the second polycarbonate resin layer between the third acrylic resin layer and the fourth acrylic resin layer. The multilayer film with the multilayer structure has less film shrinkage when the gravure print layer is printed and dried. Further, the multilayer film and the second backer film each having the multilayer structure have less film shrinkage during thermal lamination. This structure improves the dimensional accuracy of the light-transmissive patterned layer and the gravure-printed graphic layer. The second backer film with the multilayer structure has higher heat resistance and reduces flow of gravure ink in manufacturing of a polycarbonate resin molded product. The first backer film containing the acrylonitrile butadiene styrene-based resin reduces thermal damage to the gravure ink.

A polycarbonate product herein refers to a product formed using a polycarbonate-based resin as a material for injection molding.

In the decorative film described above, the polycarbonate-based resin in each of the first polycarbonate resin layer and the second polycarbonate resin layer may have a glass transition temperature of 120 to 200° C., inclusive. In the decorative film with this structure, the multilayer film and the second backer film each have sufficiently high heat resistance.

In the decorative film described above, the first backer film may have a specific heat capacity of $1.3 \times 10^3$ to $1.7 \times 10^3$ j/(kg·k), inclusive. In the decorative film with this structure, the first backer film has high specific heat capacity and reduces thermal damage to the gravure ink. In the decorative film described above, the light-transmissive patterned layer may be included in the gravure print layer. In the decorative film with this structure, the light-transmissive patterned layer in the gravure print layer has higher dimensional accuracy.

In the decorative film described above, the light-transmissive patterned layer may be on the second backer film. In the decorative film with this structure, the light-transmissive patterned layer is unaffected by thermal lamination and also has higher dimensional accuracy.

A method according to an aspect of the present invention is a method for manufacturing a decorative film for insert molding to be formed in a three-dimensional shape before insert molding. The method includes forming a gravure print layer by gravure printing and thermally laminating a first backer film, a second backer film, and a multilayer film. The forming includes forming the gravure print layer transmissive to visible light on a first main surface of the multilayer film. The multilayer film includes a first acrylic resin layer containing an acrylic-based resin, a second acrylic resin layer containing an acrylic-based resin, and a first polycarbonate resin layer between the first acrylic resin layer and the second acrylic resin layer. The first polycarbonate resin layer contains a polycarbonate-based resin. The multilayer film is transmissive to visible light. The thermally laminating includes thermally laminating the first backer film, the second backer film, and the multilayer film on which the gravure print layer is located. The first backer film contains an acrylonitrile butadiene styrene-based resin transmissive to visible light. The second backer film includes a third acrylic resin layer containing an acrylic-based resin, a fourth acrylic resin layer containing an acrylic-based resin, and a second polycarbonate resin layer between the third acrylic resin layer and the fourth acrylic resin layer. The second polycarbonate resin layer contains a polycarbonate-based resin and is transmissive to visible light. The thermally laminating includes thermally laminating a release film, the second backer film, the first backer film, and the multilayer film under heat from a first contact heater with the first contact heater in contact with the release film, the release film in contact with the second backer film, the second backer film in contact with the first backer film, and the first backer film in contact with the multilayer film on which the gravure print layer is located. The release film has a release strength with which the release film is released from the first contact heater after thermal lamination. The release strength of the release film is lower than a release strength of the second backer film with which the second backer film is released from the first contact heater after thermal lamination performed with the first contact heater in direct contact with the second backer film.

With the above method for manufacturing a decorative film for insert molding, the first contact heater is in contact with the release film and the release film is in contact with the second backer film in thermally laminating the first backer film, the second backer film, and the multilayer film. In other words, the second backer film avoids being in direct contact with the first contact heater. Thus, when the decorative film for insert molding is separated from the first contact heater after being thermally laminated, the decorative film for insert molding is pulled by the first contact heater with less force than when the second backer film is in direct contact with the first contact heater. This reduces distortion in the printed graphic element in the gravure print layer under a force applied when the decorative film for insert molding is pulled by the first contact heater.

In the method described above, the thermally laminating may include thermally laminating the first backer film and the second backer film to form a multilayer backer film with a second contact heater in contact with the first backer film and the first backer film in contact with the second backer film, and thermally laminating the release film, the multilayer backer film, and the multilayer film under heat from the first contact heater with the first contact heater in contact with the release film, the release film in contact with the second backer film in the multilayer backer film, and the first backer film in the multilayer backer film in contact with the multilayer film on which the gravure print layer is located. The above method for manufacturing a decorative film for insert molding uses fewer rolls in a laminator.

In the method described above, the forming the gravure print layer includes performing, after forming the gravure print layer, heat treatment at a temperature higher than an evaporation temperature of a solvent in a gravure ink used for the gravure print layer. The above method for manufacturing a decorative film for insert molding reduces residual solvent and also reduces foam during forming of the film.

A method according to an aspect of the present invention is a method for manufacturing a resin molded product. The method includes forming the decorative film described above in the three-dimensional shape, trimming an excess portion of the decorative film formed in the three-dimensional shape, and injecting a polycarbonate-based resin into a mold with the decorative film placed in the mold to obtain a polycarbonate resin molded product decorated with the decorative film and transmissive to visible light.

The method for manufacturing the resin molded product allows the second backer film with the multilayer structure to increase the heat resistance of the first backer film and the second backer film and to reduce ink flow in the gravure print layer in manufacturing of a polycarbonate resin molded product transmissive to visible light. The first backer film containing the acrylonitrile butadiene styrene-based resin reduces thermal damage to the gravure ink in the gravure print layer.

Advantageous Effects

The decorative film for insert molding according to the above aspects of the present invention includes the gravure-printed graphic layer and the light-transmissive patterned layer with high dimensional accuracy and has less flow of gravure ink in manufacturing of a polycarbonate resin molded product. The method for manufacturing the decorative film for insert molding according to the above aspects of the present invention allows manufacture of the decorative film for insert molding according to the above aspects of the present invention. The method for manufacturing the resin molded product according to the above aspects of the present invention allows manufacture of the resin molded product including the decorative film for insert molding according to the above aspects of the present invention.

(3) Structure of Insert Molding Decorative Film 10

Figure 8:
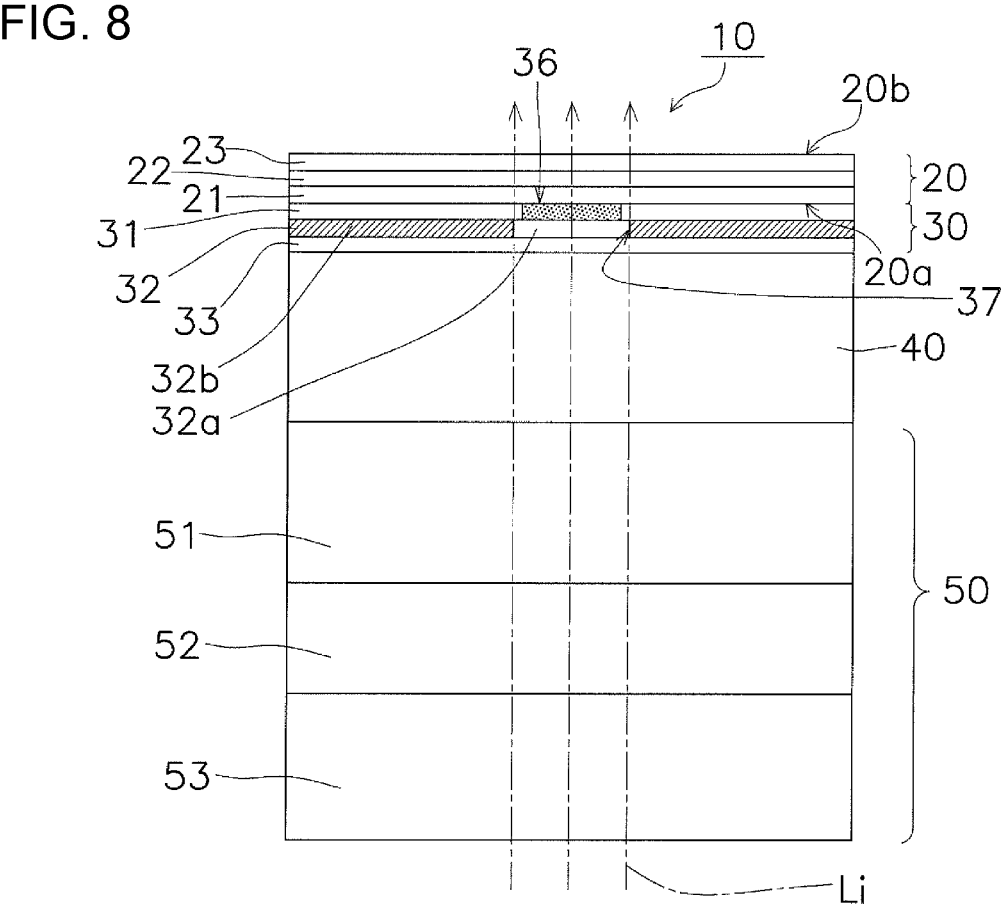
FIG. 8 is a schematic cross-sectional view of the insert molding decorative film according to the first embodiment.

As shown in FIG. 8, the insert molding decorative film 10 includes a multilayer film a gravure print layer 30, a first backer film 40, and a second backer film 50. The gravure print layer 30 includes a graphic layer 31 including a first image 36 to be at a predetermined position on the door trim 110, which is a resin molded product with a three-dimensional shape. The insert molding decorative film 10 further includes a light-transmissive patterned layer 32 including a light-transmissive pattern 37 to allow visible light Li to pass through a portion on and around the first image 36. In other words, the light-transmissive pattern 37 is located to allow visible light to pass through a predetermined portion of a graphic element in the graphic layer 31. The light-transmissive pattern 37 is the pattern of a light-transmissive portion 32a (described later). The first image 36 and the light-transmissive pattern 37 may have a permissible misalignment of less than or equal to ±0.6 mm between them.

DETAILED DESCRIPTION

First Embodiment (1) Use of Insert Molding Decorative Film

Figure 1A:
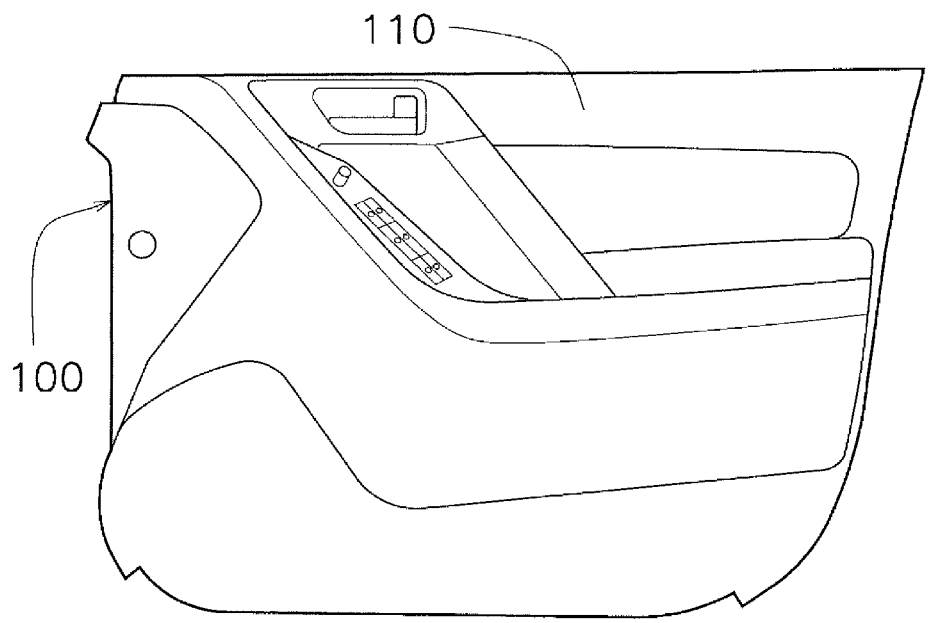
FIG. 1A is a front view of an automobile door including an insert molding decorative film according to a first embodiment.
Figure 1B:
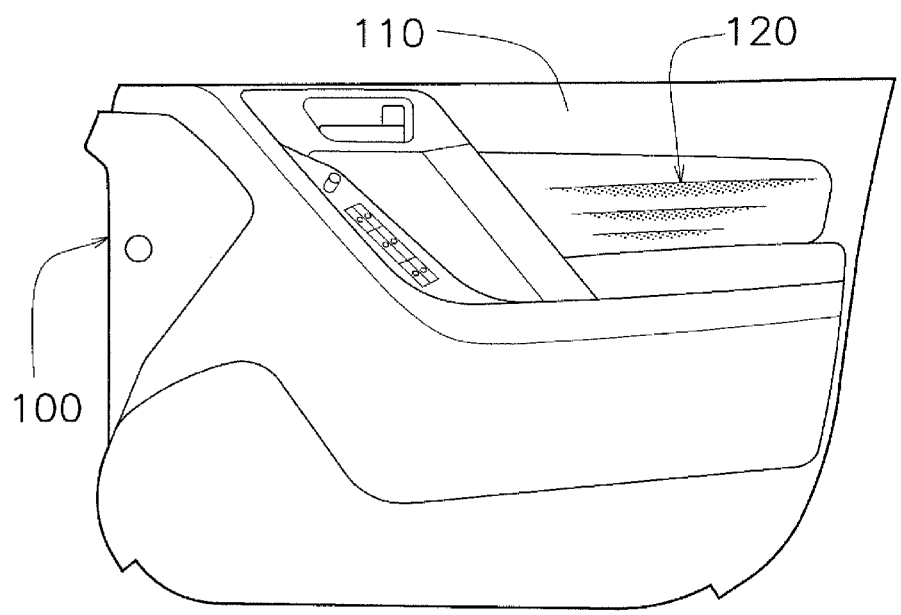
FIG. 1B is a front view of the automobile door including the insert molding decorative film according to the first embodiment.

FIGS. 1A and 1B each show an automobile door 100 including an insert molding decorative film. As shown in FIG. 1B in comparison with FIG. 1A, the door 100 can display a three-stripe design 120 with visible light on a door trim 110 on the interior of the door 100. The door trim 110 is a resin molded product decorated with the insert molding decorative film. The door trim 110 with the design 120 includes an illuminator (not shown) on its back surface, such as a light-emitting diode (LED), that is controlled on and off by an automobile system (not shown). The portion of the door trim 110 including the design 120 is manufactured by, for example, injection molding using a polycarbonate-based resin. The design 120 is formed on the door trim 110 on the door 100 using the insert molding decorative film (described later).

(2) Method for Manufacturing Resin Molded Product Using Insert Molding Decorative Film FIGS. 2 to 7 show an overview of a method for manufacturing a resin molded product using a decorative film 10 for insert molding (insert molding decorative film 10). The insert molding decorative film 10 is formed in a three-dimensional shape before insert molding to be used for insert molding. For decorating the door trim 110, for example, the insert molding decorative film 10 is formed to fit the three-dimensional shape of the door trim 110 before being inserted for injection molding of the door trim 110.

Figure 2:
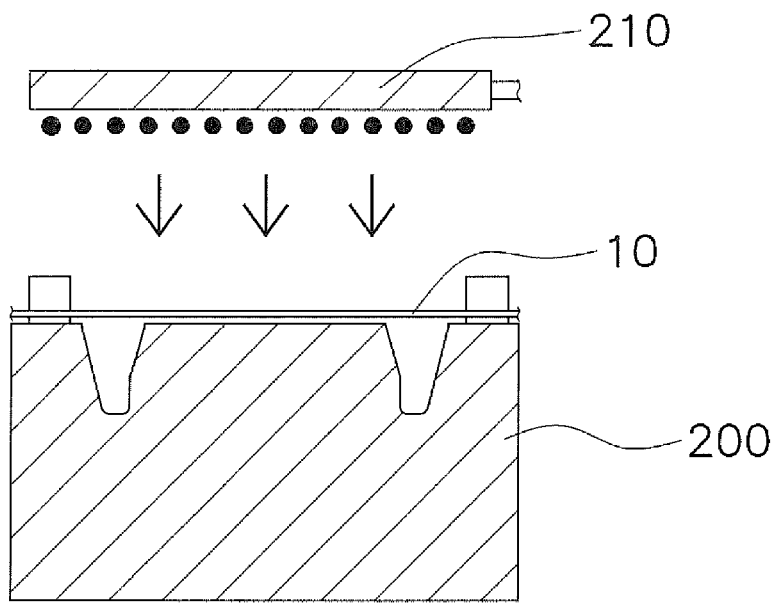
FIG. 2 is a schematic cross-sectional view of the insert molding decorative film being heated for forming.
Figure 3:
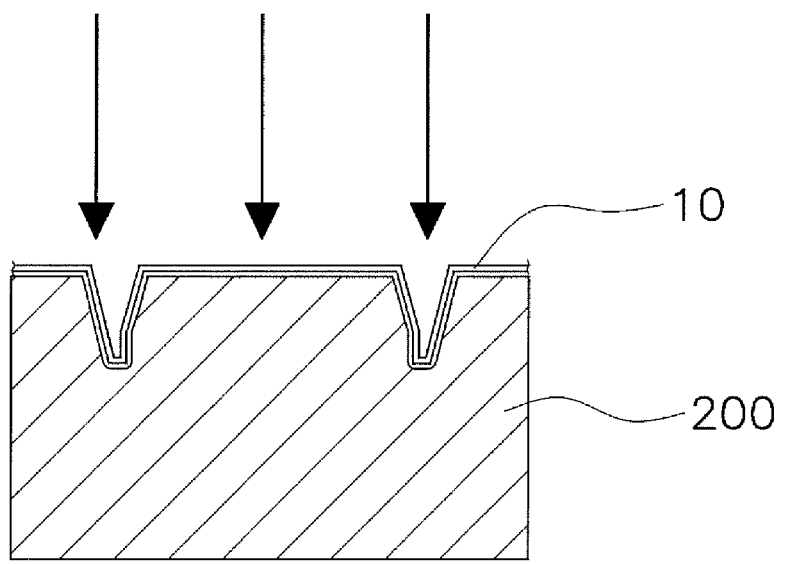
FIG. 3 is a schematic cross-sectional view of the insert molding decorative film being formed three-dimensionally.

FIGS. 2 and 3 show a process of forming the insert molding decorative film 10 in a three-dimensional shape. As shown in FIG. 2, the insert molding decorative film 10 is placed in a mold 200. The insert molding decorative film 10 is heated and softened with a heat source 210. The arrows in FIG. 2 indicate heat applied to the insert molding decorative film 10. As shown in FIG. 3, the insert molding decorative film 10 is formed in conformance with the shape of the product in the mold 200 by, for example, vacuum forming or pressure forming. The arrows in FIG. 3 indicate the direction of a force applied to the insert molding decorative film 10 in vacuum forming or pressure forming.

Figure 4:
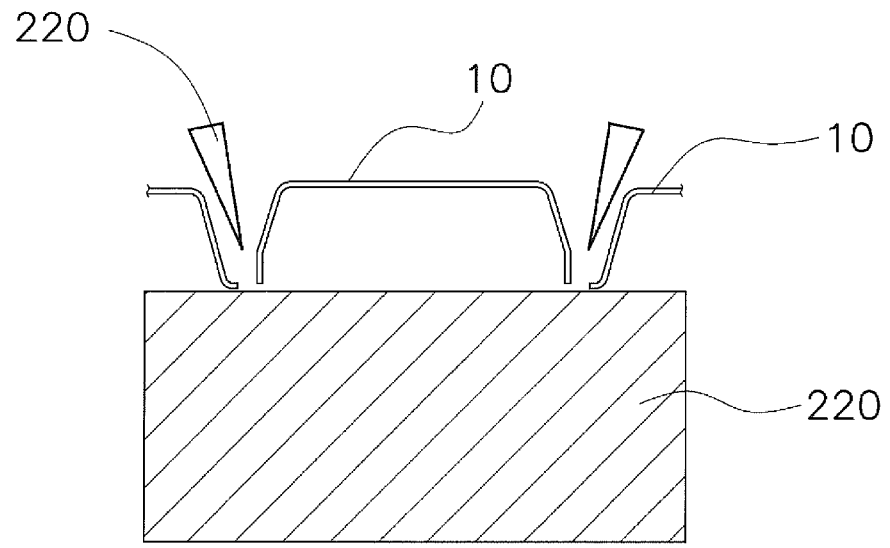
FIG. 4 is a schematic cross-sectional view of the insert molding decorative film being trimmed.

FIG. 4 shows a process of trimming an excess portion of the insert molding decorative film 10 formed in a three-dimensional shape. The film is trimmed using, for example, a die-cut machine or a laser. FIG. 4 shows a die 220 included in the die-cutting machine.

Figure 5:
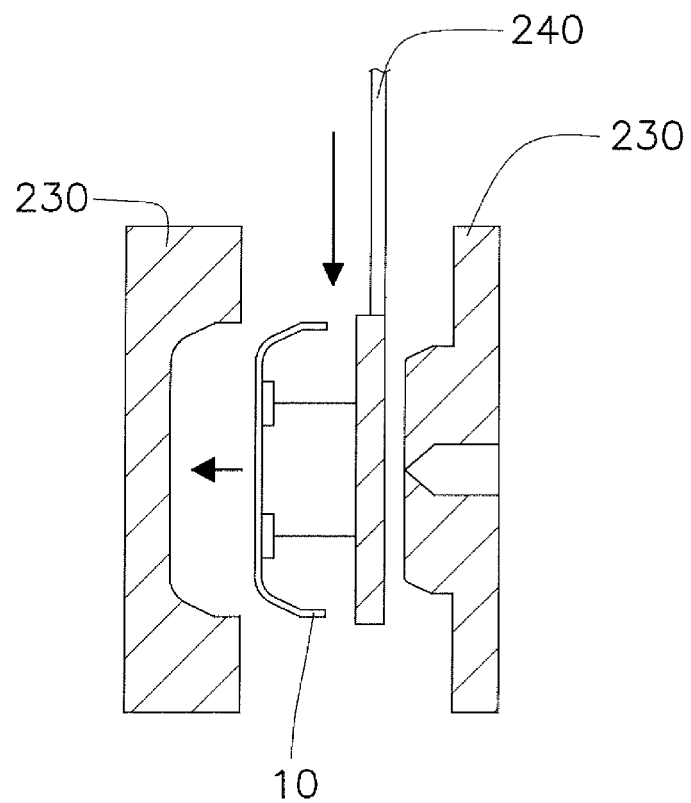
FIG. 5 is a schematic cross-sectional view of a mold and the insert molding decorative film placed in the mold.
Figure 6:
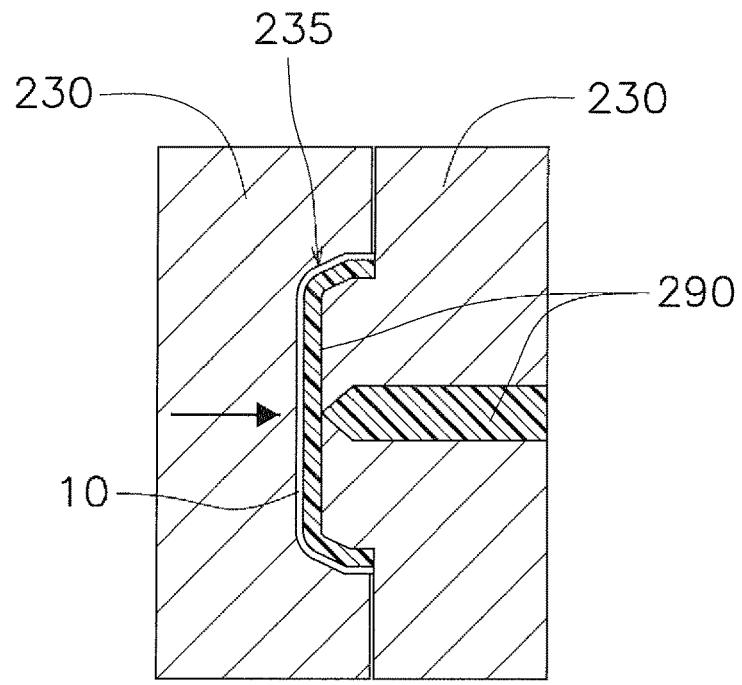
FIG. 6 is a schematic cross-sectional view of the mold filled with a molten resin after the insert molding decorative film is placed in the mold.
Figure 7:
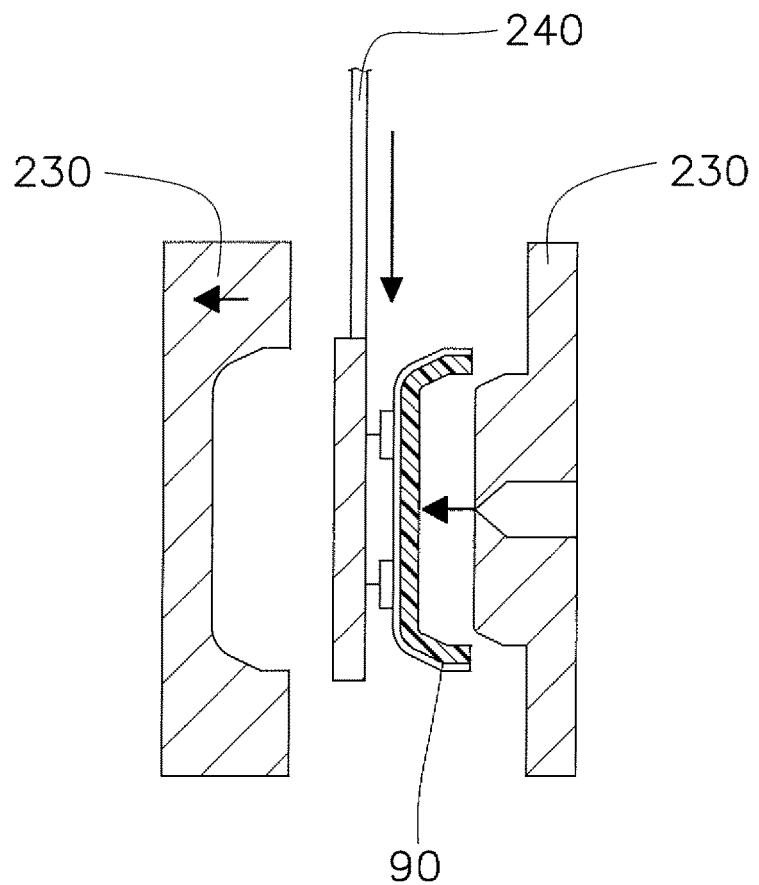
FIG. 7 is a schematic cross-sectional view of the mold and a resin molded product integral with the insert molding decorative film being retrieved from the mold.

FIGS. 5 to 7 show an example injection molding process. The injection molding process includes placing the insert molding decorative film 10 in a mold 230 and injecting a polycarbonate-based resin into the mold 230 to obtain a polycarbonate resin molded product 90 decorated with the insert molding decorative film 10. FIG. 5 shows the mold 230 being open and the insert molding decorative film 10 formed three-dimensionally and placed in the mold 230. In FIG. 5, the insert molding decorative film 10 is placed in the mold 230 with a robotic arm 240. The arrows in FIG. 5 indicate the moving direction of the insert molding decorative film 10.

FIG. 6 shows the mold 230 being closed, with its cavity 235 being filled with a molten resin 290, which is a polycarbonate-based resin molten under heat. The molding temperature of the resin molded product 90 containing a polycarbonate-based resin (the temperature of the molten resin 290) is typically 260 to 320° C. The insert molding decorative film 10 according to a first embodiment may be molded at 300° C. or higher. The arrow in FIG. 6 indicates the movement of a movable part of the mold 230 for closing the mold 230. FIG. 7 shows the mold 230 being open and the resin molded product 90 formed from the polycarbonate-based resin being retrieved from the mold 230.

After the mold 230 is open, the robotic arm 240 enters the space in the mold 230 to retrieve the resin molded product 90 out of the mold 230. The arrow on the mold 230 in FIG. 7 indicates the moving direction of the movable part. The arrows around the robotic arm 240 and the resin molded product 90 indicate the moving direction of the resin molded product 90. The resin molded product 90 is an example of the door trim 110 described above.

(3-1) Multilayer Film 20

The multilayer film 20 has a first main surface 20*a* and a second main surface 20*b*. The multilayer film 20 transmits visible light. The multilayer film 20 has a thickness of, for example, 30 to 150 The multilayer film 20 with a thickness of 30 to 150 µm may be used for gravure printing. In the first embodiment, the multilayer film 20 has a thickness of, for example, 50 µm. The multilayer film 20 includes a first acrylic resin layer 21, a second acrylic resin layer 23, and a first polycarbonate resin layer 22 between the first acrylic resin layer 21 and the second acrylic resin layer 23. The first acrylic resin layer 21 has the first main surface 20*a* being exposed. The second acrylic resin layer 23 has the second main surface 20*b* being exposed.

Each of the first acrylic resin layer 21 and the second acrylic resin layer 23 is formed from an acrylic-based resin. Examples of the acrylic-based resin used for each of the first acrylic resin layer 21 and the second acrylic resin layer 23 include a methyl methacrylate resin or polymethyl methacrylate (PMMA). In one or more embodiments of the present invention, each of the first acrylic resin layer 21 and the second acrylic resin layer 23 formed from an acrylic-based resin may further contain an additive.

The first polycarbonate resin layer 22 is formed from a polycarbonate-based resin. Examples of the polycarbonate-based resin used for the first polycarbonate resin layer 22 include a polycarbonate resin. In one or more embodiments of the present invention, the first polycarbonate resin layer 22 formed from a polycarbonate-based resin may further contain an additive. To reduce the rate of film shrinkage in gravure printing, the first polycarbonate resin layer 22 has a thickness smaller than the thickness of the multilayer film 20, and may have a thickness of 10 to 105 µm. The first polycarbonate resin layer 22 has a glass transition temperature (Tg) of, for example, 120 to 200° C. To achieve high heat resistance, the glass transition temperature (Tg) may be higher, or specifically, 150 to 200° C., or more specifically, 170 to 200° C. The glass transition temperature (Tg) is measured in accordance with Japanese Industrial Standards (JIS) 7121.

The multilayer film 20 may have the rate of shrinkage of −0.20 to +0.20% in gravure printing, or specifically, −0.15 to +0.15%, in both the feeding direction and the width direction of the multilayer film 20.

(3-2) Gravure Print Layer 30

The gravure print layer 30 is located on the first main surface 20*a* of the multilayer film 20. More specifically, the gravure print layer 30 is located on the first main surface 20*a* of the multilayer film 20 (the exposed surface of the first acrylic resin layer 21). The gravure print layer 30 includes the graphic layer 31, the light-transmissive patterned layer 32, and an adhesive layer 33. The graphic layer 31 and the light-transmissive patterned layer 32 are formed using known gravure ink. The gravure ink contains a binder resin, a solvent, and a colorant. Examples of the binder resin include a vinyl chloride-vinyl acetate copolymer resin, an acrylic-based resin, a polyester-based resin, and a polyurethane-based resin. The solvent to dissolve the resin is selected as appropriate for the resin. Examples of the solvent in the gravure ink include toluene, methyl ethyl ketone, ethyl acetate, and isopropyl alcohol.

The light-transmissive patterned layer 32 includes a gravure-printed shield portion 32*b* for blocking visible light and the light-transmissive portion 32*a* with no shield portion 32*b* printed.

The light-transmissive patterned layer 32 is aligned with the graphic layer 31 when being printed. The light-transmissive patterned layer 32 aligned with the graphic layer 31 allows visible light passing through the light-transmissive patterned layer 32 to pass through a predetermined portion of the graphic layer 31. As shown in FIG. 1B, the design 120 transmissive to visible light is to be at a predetermined position on an object to be decorated (e.g., the door 100) with high dimensional accuracy. The adhesive layer 33 is bonded to the first backer film 40. The adhesive layer 33 transmits visible light. Examples of the adhesive used for the adhesive layer 33 include a vinyl chloride-vinyl acetate copolymer resin, an acrylic-based resin, a polyester-based resin, and a polyurethane-based resin.

(3-3) First Backer Film 40 and Second Backer Film 50

The first backer film 40 and the second backer film 50 are thermally laminated to form a multilayer backer film.

The first backer film 40 is formed from an acrylonitrile butadiene styrene-based (ABS-based) resin that is transmissive to visible light. Examples of the ABS-based resin that is transmissive to visible light include an ABS resin transmissive to visible light and a methyl methacrylate acrylonitrile butadiene styrene (MABS) resin transmissive to visible light. In one or more embodiments of the present invention, the first backer film 40 formed from an ABS-based resin transmissive to visible light may further contain an additive.

The first backer film 40 has a specific heat capacity of $1.3 \times 10^3$ to $1.7 \times 10^3$ J/(kg·K), inclusive. The specific heat capacity is measured in accordance with JIS K7123. The first backer film 40 with a higher specific heat capacity can reduce the temperature rise in the gravure print layer 30. However, the first backer film 40 with too high of a specific heat capacity cannot be heated easily and may not bond to other layers with high adhesion.

The first backer film 40 has a thickness of, for example, 100 to 250 µm. A thicker first backer film 40 can reduce thermal damage. The first backer film 40 may thus have a thickness of 150 to 250 µm, or specifically, 200 to 250 µm.

The second backer film 50 is located opposite to the multilayer film 20 across the first backer film 40. The second backer film 50 has a thickness of, for example, 200 to 500 µm. The second backer film 50 includes a third acrylic resin layer 51, a fourth acrylic resin layer 53, and a second polycarbonate resin layer 52 between the third acrylic resin layer 51 and the fourth acrylic resin layer 53. Each of the third acrylic resin layer 51 and the fourth acrylic resin layer 53 is formed from an acrylic-based resin. Examples of the acrylic-based resin used for each of the third acrylic resin layer 51 and the fourth acrylic resin layer 53 include PMMA. In one or more embodiments of the present invention, each of the third acrylic resin layer 51 and the fourth acrylic resin layer 53 formed from an acrylic-based resin may further contain an additive.

The second polycarbonate resin layer 52 is formed from a polycarbonate-based resin. Examples of the polycarbonate-based resin used for the second polycarbonate resin layer 52 include a polycarbonate resin. In one or more embodiments of the present invention, the second polycarbonate resin layer 52 formed from a polycarbonate-based resin may further contain an additive. The second polycarbonate resin layer 52 has a thickness smaller than the thickness of the second backer film 50, and may have a thickness of, for example, 70 to 350 µm. For high heat resistance and formability, the second polycarbonate resin layer 52 may have a thickness of 105 to 280 µm, or specifically, 140 to 210 µm. The first polycarbonate resin layer 22 has a glass transition temperature (Tg) of, for example, 120 to 200° C.

To achieve high heat resistance, the glass transition temperature (Tg) may be higher, or specifically, 150 to 200° C., or more specifically, 170 to 200° C.

Figure 9:
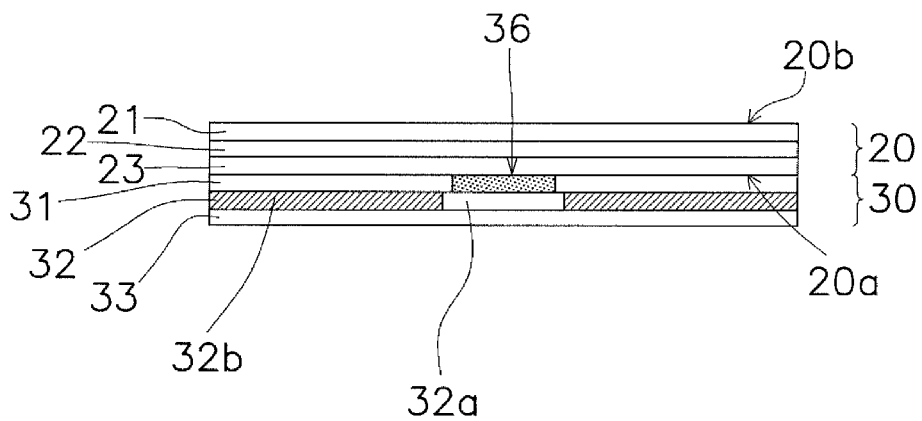
FIG. 9 is a schematic cross-sectional view of an example multilayer film with a printed gravure print layer.
Figure 10:
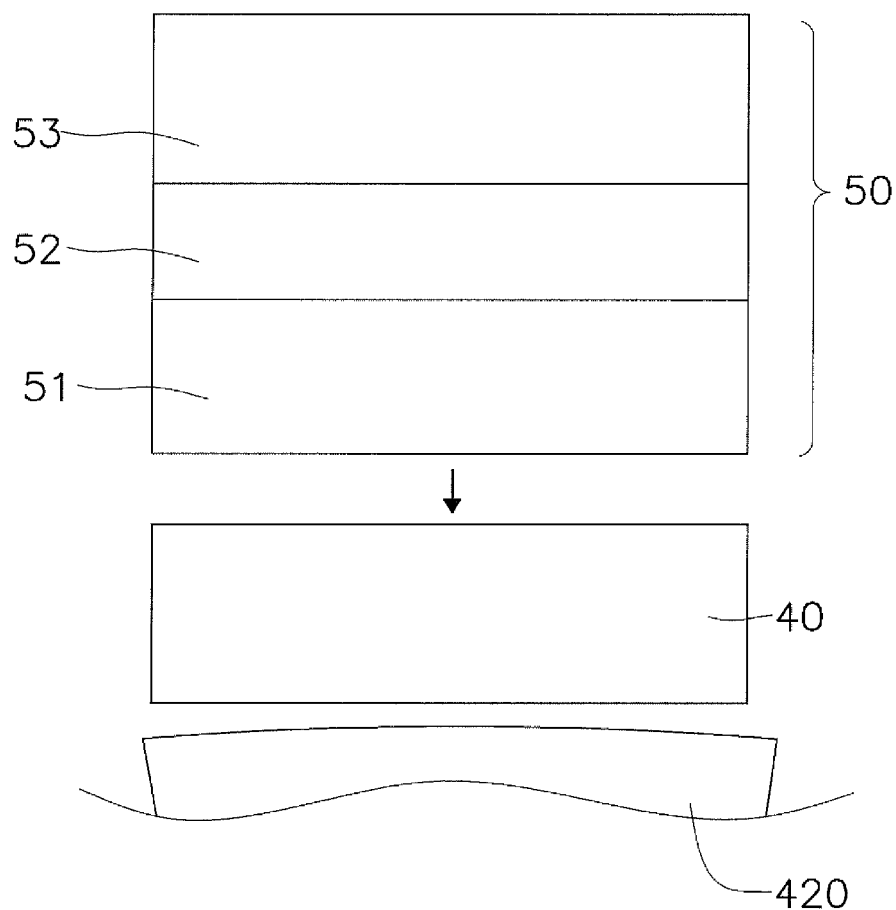
FIG. 10 is a schematic cross-sectional view of a first backer film and a second backer film to be thermally laminated in a first thermal lamination step.

(4) Method for Manufacturing Insert Molding Decorative Film 10 According to First Embodiment FIGS. 9 to 12 show an example method for manufacturing the insert molding decorative film 10. FIGS. 9 and 10 each show a partial cross section of an elongated sheet. In a first step, as shown in FIG. 9, the gravure print layer 30 is formed on the first main surface 20a of the multilayer film 20 by gravure printing. More specifically, the graphic layer 31 is first printed on the multilayer film 20 by gravure printing. The shield portion 32b is aligned with the graphic layer 31 and is printed by gravure printing to form the light-transmissive patterned layer 32 that allows visible light to pass through a predetermined portion of the graphic layer 31. In other words, the light-transmissive portion 32a of the light-transmissive patterned layer 32 is located on the predetermined portion of the graphic layer 31. An adhesive is further printed on the light-transmissive patterned layer 32 by gravure printing to form the adhesive layer 33.

The first step includes, after printing of the gravure print layer 30, heat treatment performed at a temperature higher than the evaporation temperature of the solvent in the gravure ink used for the gravure print layer 30. After the heat treatment, the gravure ink contains less residual solvent than before the heat treatment.

Figure 11:
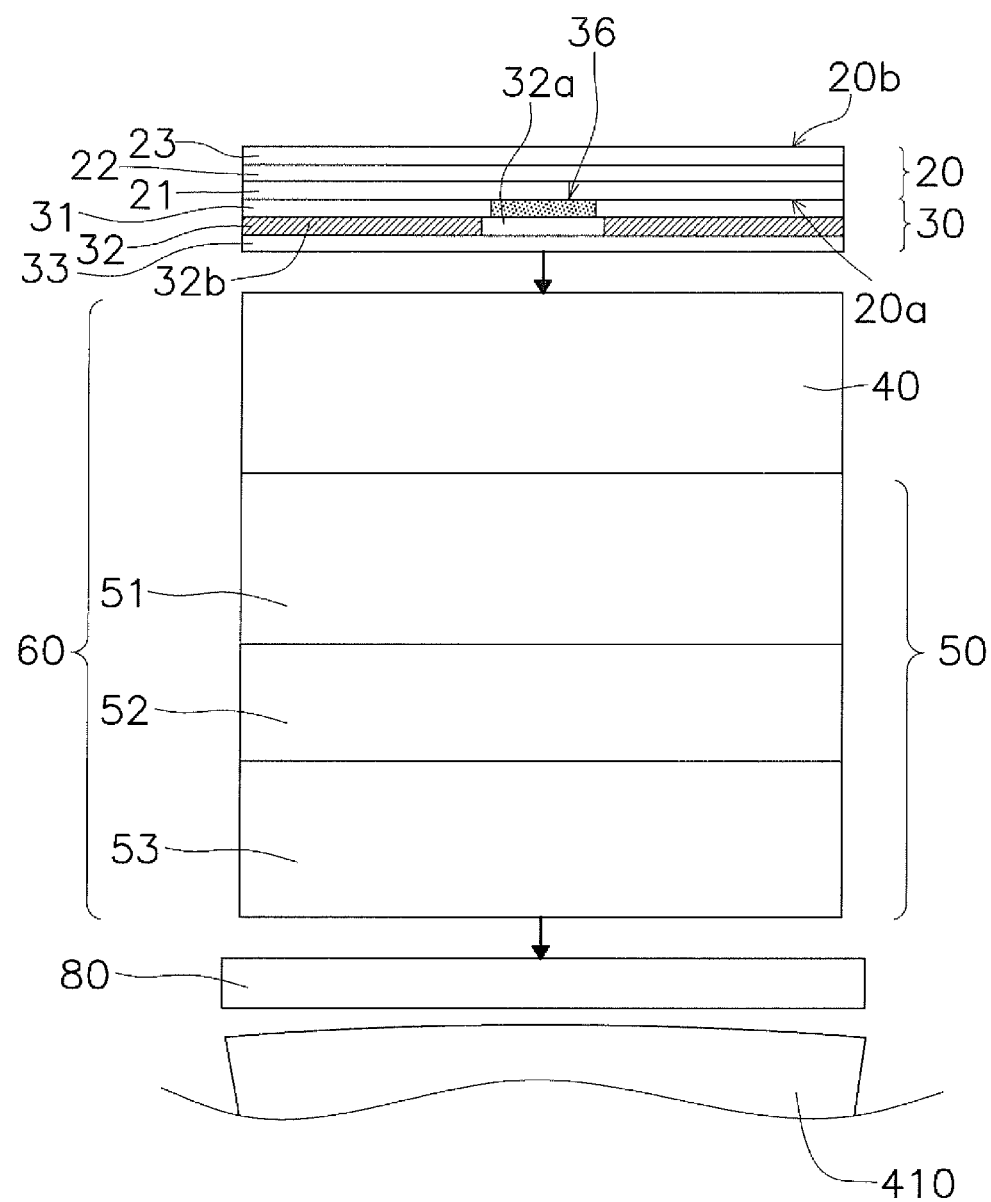
FIG. 11 is a schematic cross-sectional view of the insert molding decorative film to be thermally laminated entirely in a second thermal lamination step.

A second step includes a first thermal lamination step shown in FIG. 10 and a second thermal lamination step shown in FIG. 11.

In the first thermal lamination step, the first backer film 40 and the second backer film are thermally laminated to form a multilayer backer film 60 (refer to FIG. 11) with a heating drum 420 (second contact heater) in contact with the first backer film 40 and the first backer film in contact with the second backer film 50. The heating drum 420 has a temperature of, for example, 170° C. Heat from the heating drum 420 is transferred to the first backer film 40 and then to the second backer film 50. In the first thermal lamination step, the heating drum 420 is in contact with the first backer film 40 without strongly sticking to the first backer film 40 during thermal lamination.

In the second thermal lamination step, a heating drum 410 (first contact heater) is used to apply heat to thermally laminate a polyethylene terephthalate (PET) film 80 (release film), the multilayer backer film 60, and the multilayer film 20. The heating drum 410 has a temperature of, for example, 170° C. The thermal lamination is performed with the heating drum 410 in contact with the PET film 80, the PET film 80 in contact with the second backer film 50 in the multilayer backer film 60, and the first backer film 40 in the multilayer backer film 60 in contact with the multilayer film 20 on which the gravure print layer 30 is located. The PET film 80 has a thickness of, for example, 38 to 75 μm.

The heating drum 410 and the heating drum 420 may be identical drums. Although the heating drum 410 is used as the first contact heater and the heating drum 420 is used as the second contact heater in the present embodiment, any elements other than such heating drums may be used as the first contact heater and the second contact heater. The first contact heater and the second contact heater may be any elements that can apply heat and pressure to laminate films in contact with one another.

The PET film 80 used as the release film may be replaced with any other film. The release film may be a film other than the PET film 80 but of a similar type. For example, the release film may be a polyethylene naphthalate (PEN) film.

The release strength with which the release film is released from the heating drum 410 after thermal lamination may be lower than the release strength with which the second backer film 50 is released from the heating drum 410 after thermal lamination performed with the heating drum 410 in direct contact with the second backer film 50.

Figure 12:
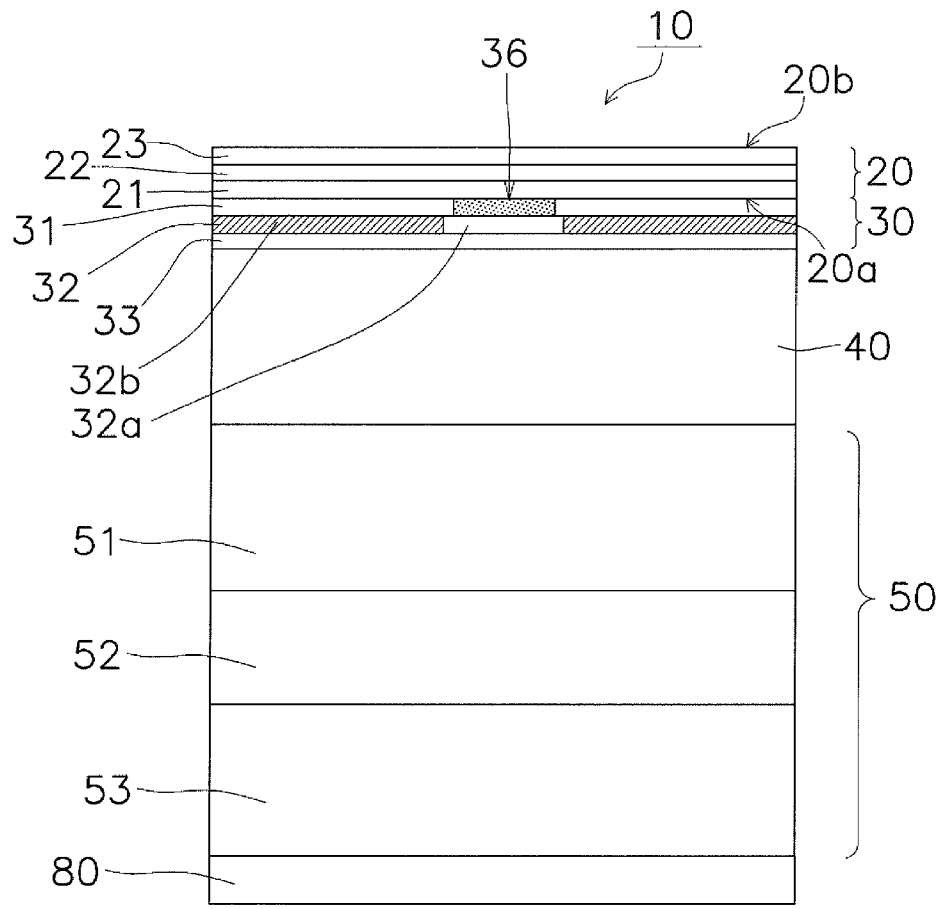
FIG. 12 is a schematic cross-sectional view of a stack of the insert molding decorative film and a polyethylene terephthalate (PET) film immediately after thermal lamination.
Figure 13:
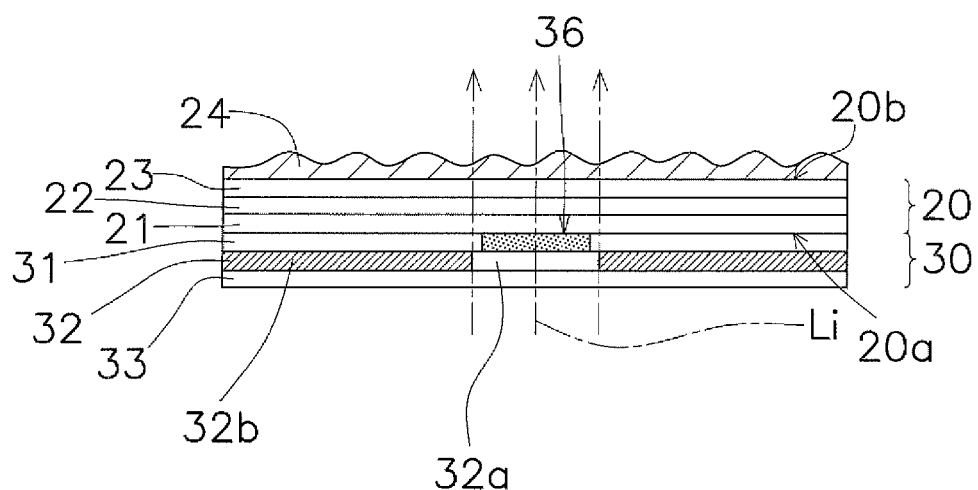
FIG. 13 is a schematic cross-sectional view of another example multilayer film with a printed gravure print layer.
Figure 14:
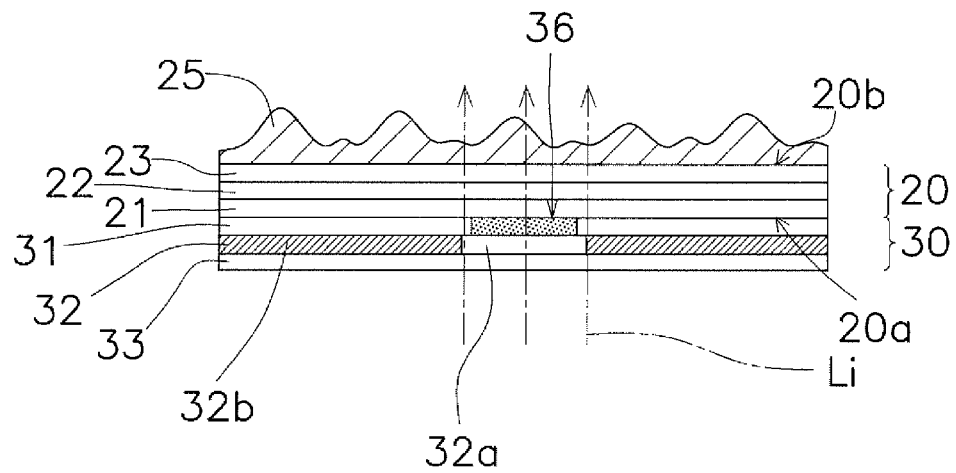
FIG. 14 is a schematic cross-sectional view of another example multilayer film with a printed gravure print layer.

As shown in FIG. 12, the PET film 80 is located on the insert molding decorative film 10 immediately after thermal lamination. The PET film 80 is then released from the laminate shown in FIG. 12 to produce the insert molding decorative film 10.

Second Embodiment (5) Use of Insert Molding Decorative Film

An insert molding decorative film according to a second embodiment is used for, for example, an automobile door 100, similarly to the insert molding decorative film according to the first embodiment.

(6) Method for Manufacturing Resin Molded Product Using Insert Molding Decorative Film The insert molding decorative film according to the second embodiment can be used to manufacture a resin molded product with, for example, the method shown in FIGS. 2 to 7 as in the first embodiment.

(7) Structure of Insert Molding Decorative Film 10

Figure 15:
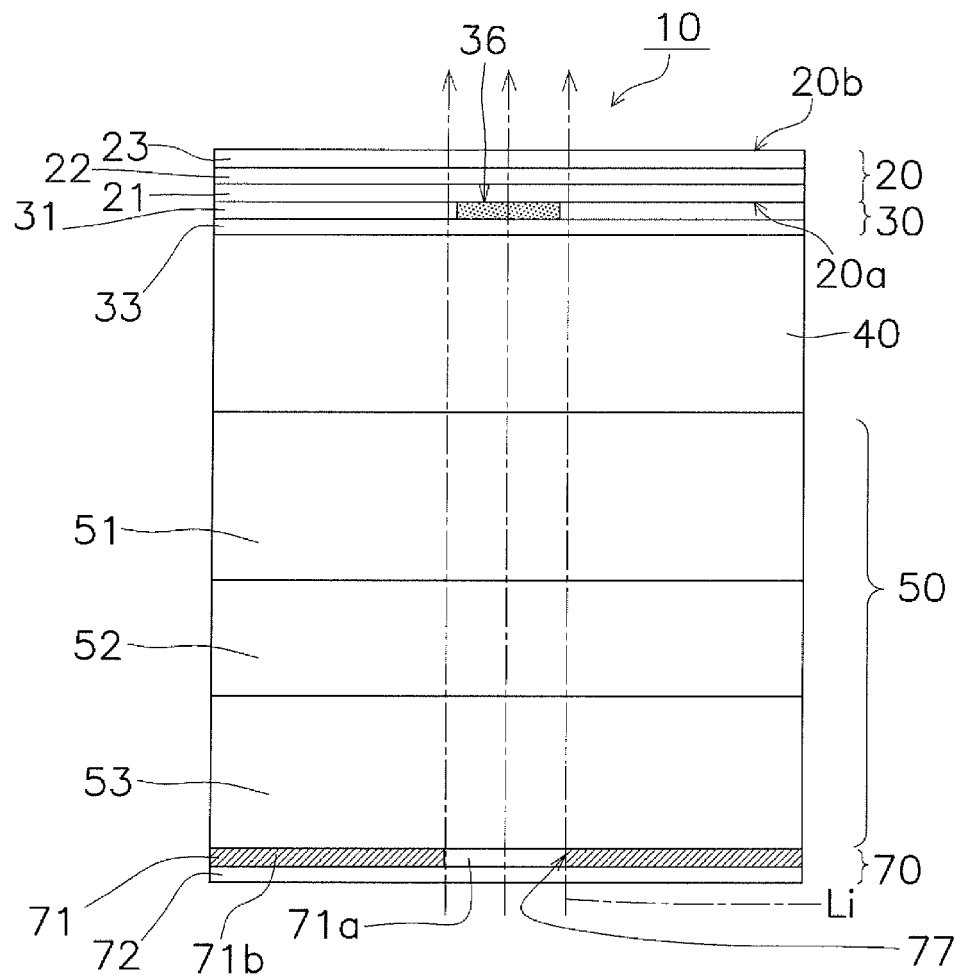
FIG. 15 is a schematic cross-sectional view of an insert molding decorative film according to a second embodiment.

As shown in FIG. 15, the insert molding decorative film 10 includes the multilayer film 20, the gravure print layer 30, the first backer film 40, the second backer film 50, and a screen print layer 70. In the insert molding decorative film 10 according to the second embodiment as well, the gravure print layer 30 includes the graphic layer 31 including the first image 36 to be at a predetermined position on the door trim 110, which is a resin molded product with a three-dimensional shape. The insert molding decorative film 10 further includes a light-transmissive patterned layer 71 including a light-transmissive pattern 77 to allow visible light Li to pass through a portion on and around the first image 36. In other words, the light-transmissive pattern 77 is located to allow visible light to pass through a predetermined portion of a graphic element in the graphic layer 31. The light-transmissive pattern 77 is the pattern of a light-transmissive portion 71a (described later). The first image 36 and the light-transmissive pattern 77 may have permissible misalignment of less than or equal to ±5 mm between them.

(7-1) Multilayer Film 20

The multilayer film 20 in the second embodiment has the same structure as the multilayer film 20 in the first embodiment. Thus, the structure of the multilayer film 20 in the second embodiment will not be described.

(7-2) Gravure Print Layer 30

The gravure print layer 30 in the second embodiment is also located on the first main surface 20a of the multilayer film 20. More specifically, the gravure print layer 30 is located on the first main surface 20a of the multilayer film 20 (the exposed surface of the first acrylic resin layer 21). The gravure print layer 30 includes the graphic layer 31 and the adhesive layer 33. Unlike the gravure print layer 30 in the first embodiment, the gravure print layer 30 in the second embodiment does not include the light-transmissive patterned layer 32. In the gravure print layer 30 in the second embodiment, the graphic layer 31 and the adhesive layer 33 are adjacent to each other. In other words, the adhesive layer 33 is printed on the graphic layer 31 formed on the multilayer film 20. The graphic layer 31 and the adhesive layer 33 in the second embodiment are the same as or similar to the graphic layer 31 and the adhesive layer 33 in the first embodiment, and thus will not be described.

(7-3) First Backer Film 40 and Second Backer Film 50

The insert molding decorative film 10 according to the second embodiment also includes the multilayer backer film 60 (refer to FIG. 17) including the first backer film 40 and the second backer film 50 thermally laminated. The multilayer backer film 60 including the first backer film 40 and the second backer film 50 in the second embodiment is the same as or similar to the multilayer backer film 60 in the first embodiment, and thus will not be described.

Figure 16:
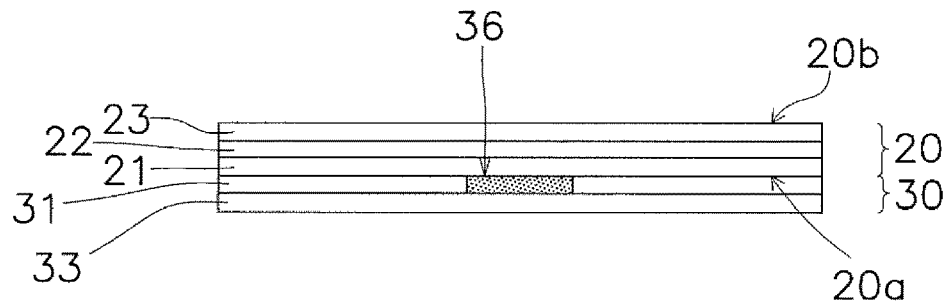
FIG. 16 is a schematic cross-sectional view of an example multilayer film with a printed gravure print layer.
Figure 17:
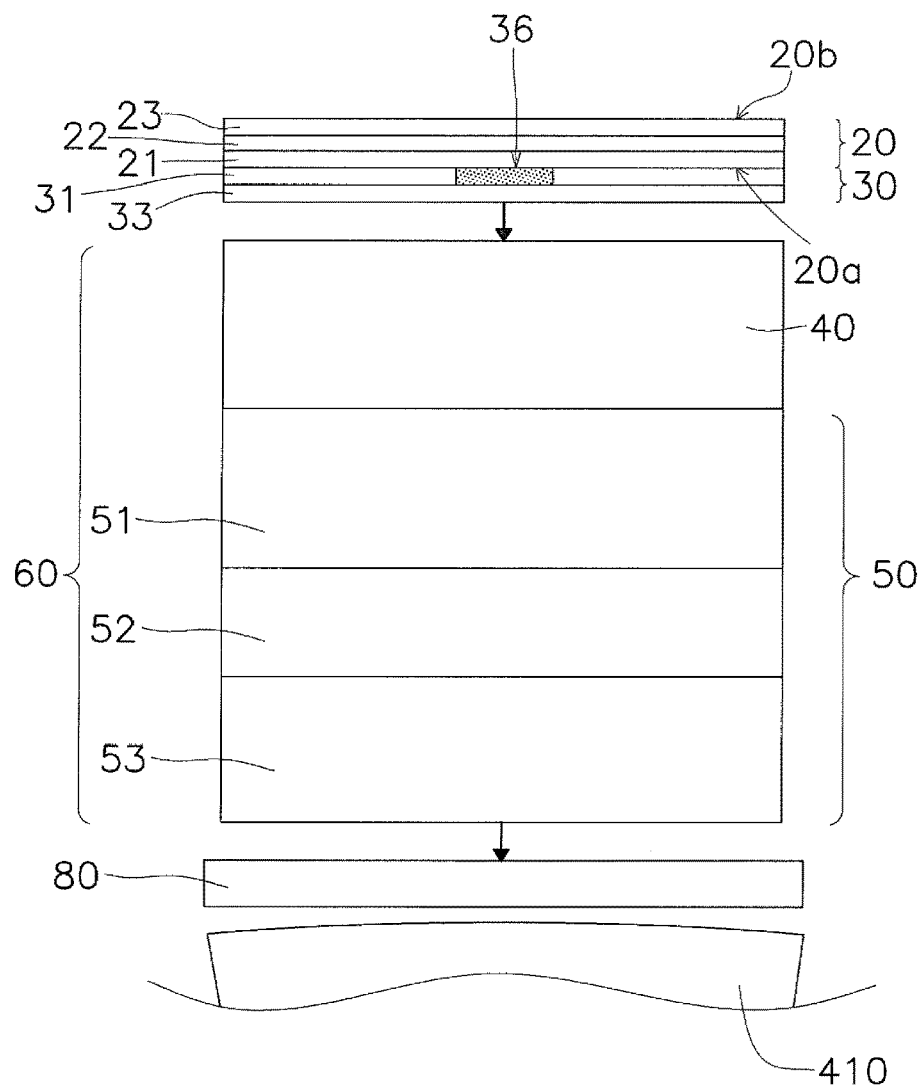
FIG. 17 is a schematic cross-sectional view of the insert molding decorative film to be thermally laminated entirely in a second thermal lamination step.

(8) Method for Manufacturing Insert Molding Decorative Film 10 According to Second Embodiment FIGS. 16 to 19 show an example method for manufacturing the insert molding decorative film 10 according to the second embodiment. FIGS. 16 and 17 each show a partial cross section of an elongated sheet. In a first step, as shown in FIG. 16, the gravure print layer 30 is formed on the first main surface 20a of the multilayer film 20 by gravure printing. More specifically, the graphic layer 31 is first printed on the multilayer film 20 by gravure printing. An adhesive is then printed on the graphic layer 31 by gravure printing to form the adhesive layer 33.

The first step includes, after printing of the gravure print layer 30, heat treatment performed at a temperature higher than the evaporation temperature of the solvent in the gravure ink used for the gravure print layer 30. After the heat treatment, the gravure ink contains less residual solvent than before the heat treatment.

With the method for manufacturing the insert molding decorative film 10 according to the second embodiment, a second step includes a first thermal lamination step shown in FIG. 10 and a second thermal lamination step shown in FIG. 17.

In the first thermal lamination step, a heating drum 420 (second contact heater) is in contact with the first backer film 40, and the first backer film 40 is in contact with the second backer film 50. In this state, the first backer film 40 and the second backer film 50 are thermally laminated to form the multilayer backer film 60 (refer to FIG. 17). The heating drum 420 has a temperature of, for example, 170° C.

As shown in FIG. 17, the heating drum 410 (first contact heater) is used to apply heat to thermally laminate the PET film 80 (release film), the multilayer backer film 60, and the multilayer film 20 in the second thermal lamination step in the second embodiment, as in the second lamination step in the first embodiment. The second thermal lamination step in the second embodiment is performed in the same manner as the second lamination step in the first embodiment except for the structure of the gravure print layer 30, and thus will not be described.

Figure 18:
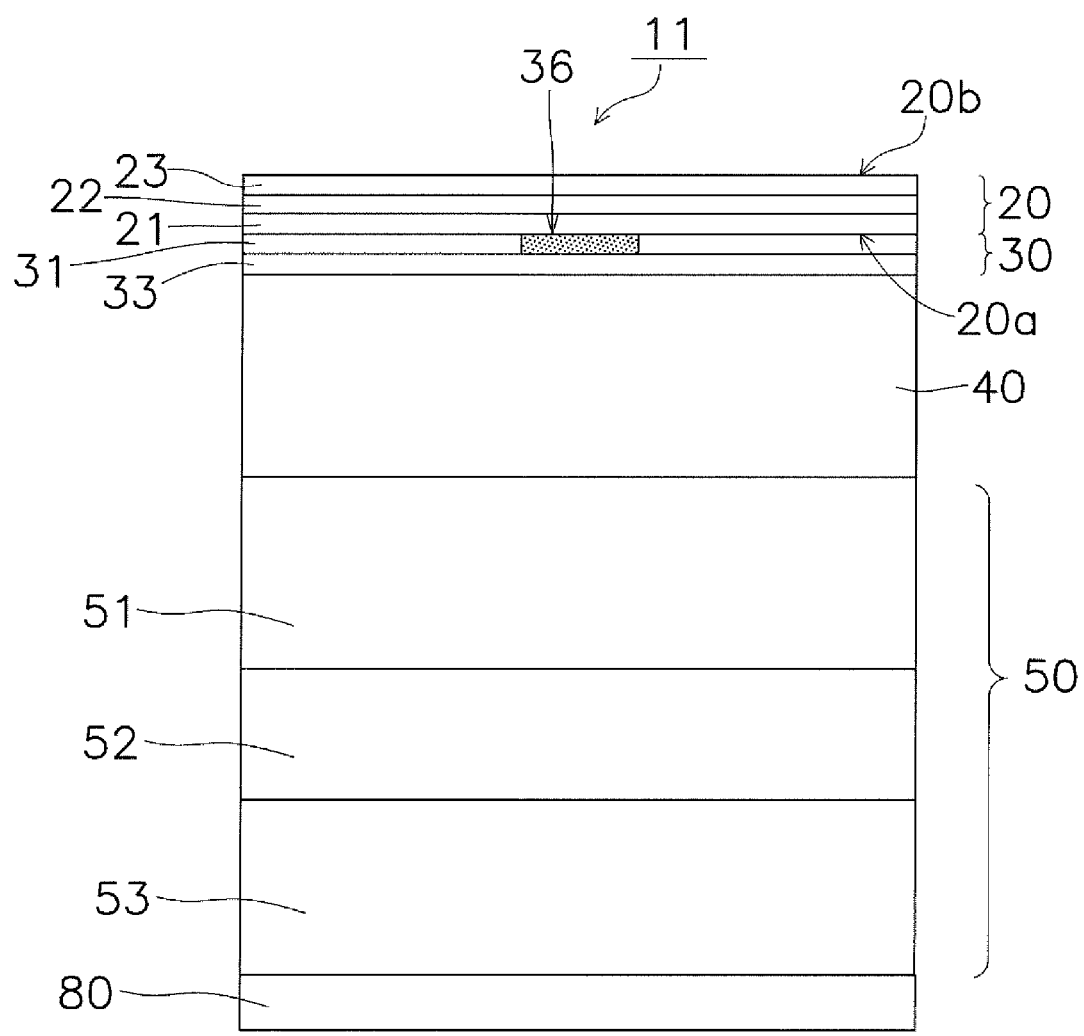
FIG. 18 is a schematic cross-sectional view of a stack of a unit film of the insert molding decorative film and a PET film immediately after thermal lamination.
Figure 19:
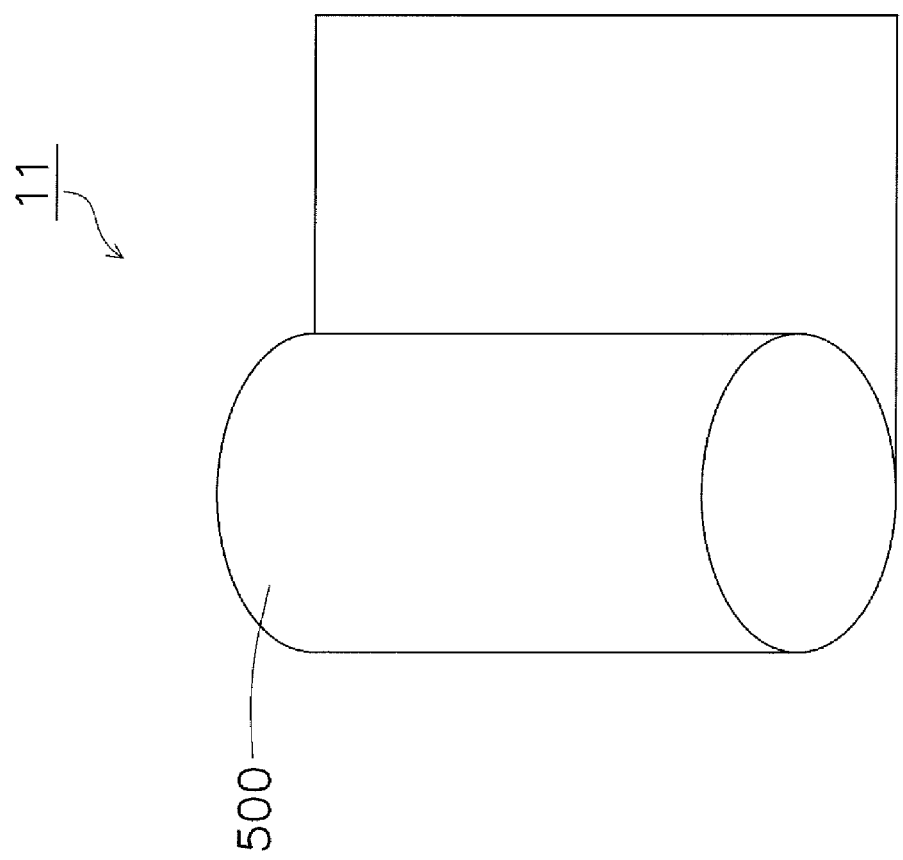
FIG. 19 is a schematic diagram of a unit film of the insert molding decorative film being cut in a cutting step.
Figure 20:
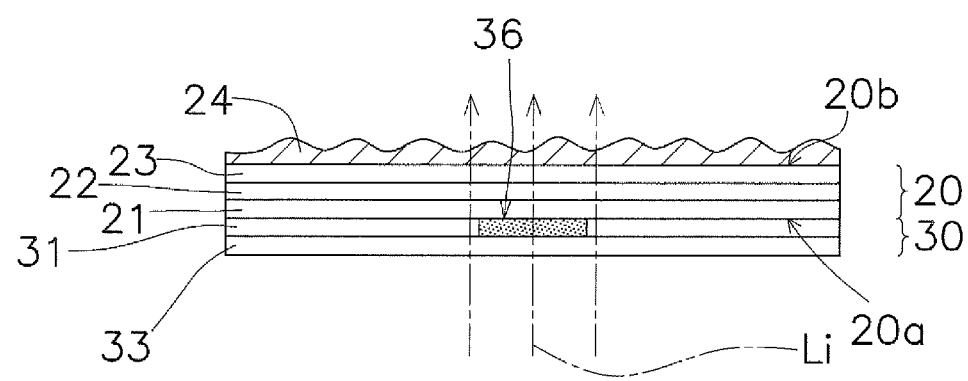
FIG. 20 is a schematic cross-sectional view of another example multilayer film with a printed gravure print layer.
Figure 21:
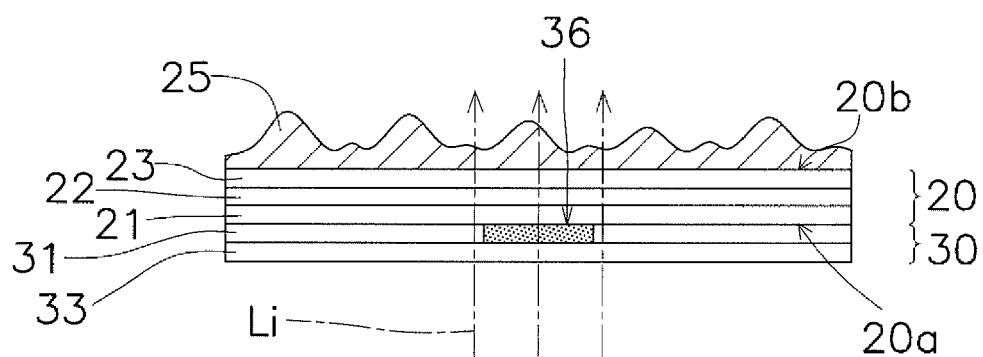
FIG. 21 is a schematic cross-sectional view of another example multilayer film with a printed gravure print layer.

As shown in FIG. 18, the PET film 80 is located on a unit film 11 of the inert-molding decorative film immediately after thermal lamination. FIG. 18 shows the cross-sectional structure of the unit film 11 of the inert-molding decorative film. The unit film 11 is a roll 500 shown in FIG. 19 immediately after thermal lamination. In a subsequent step, a sheet 510 is produced from the unit film 11 as the roll 500 as shown in FIG. 19. The sheet 510 may be produced by, for example, slitting or cutting. In other words, the elongated unit film 11 as the roll 500 is cut into the sheet 510 with a predetermined shorter length. When the sheet 510 is produced, the unit film 11 includes the PET film 80 that has been laminated.

In the subsequent screen printing step, the screen print layer 70 is formed on the second backer film 50 in the unit film 11 as a sheet after the PET film 80 is released. More specifically, the PET film 80 is first released from the unit film 11 as a sheet. The light-transmissive patterned layer 71 is then printed on the second backer film 50 by screen printing using known screen printing ink. The light-transmissive patterned layer 71 includes a screen-printed shield portion 71b for blocking visible light and the light-transmissive portion 71a without any shield portion 71b being printed. The light-transmissive patterned layer 71 is aligned with the graphic layer 31 when being printed. Further, an adhesive layer 72 is printed on the light-transmissive patterned layer 71 by screen printing. Examples of the material used for the adhesive layer 72 include a vinyl chloride-vinyl acetate copolymer resin, a polyester-based resin, and an acrylic-based resin.

(9) Modifications (9-1) Modification A

In the first embodiment and the second embodiment, the multilayer film 20 has an exposed surface (second main surface 20b). In some embodiments, the multilayer film 20 may include a surface layer on the second main surface 20b. For example, as shown in FIGS. 13, 14, 20, and 21, the multilayer film 20 may include a matte layer 24 or 25 that is transmissive to visible light as a surface layer on the second main surface 20b. The matte layer 24 or 25 may have an opening to allow passage of visible light.

The matte layer 24 has a surface roughness (Rz, measured in accordance with JIS B0601) with the distance between the highest peak and the lowest valley being less than 20 which is visually perceivable roughness. The matte layer 25 has a surface roughness (Rz, measured in accordance with JIS B0601) with the distance between the highest peak and the lowest valley being greater than or equal to 20 which is visually and tactually perceivable roughness.

The multilayer film 20 may include, instead of the matte layer 24 or 25, another graphic layer formed on the second main surface 2b by gravure printing. In this case, the gravure print layer on the second main surface 2b of the multilayer film 20 may be formed at the same time as the gravure print layer 30 on the first main surface 2a. The graphic layer on the second main surface 2b of the multilayer film 20 includes a second image that may be placed with reference to the first image 36 in the graphic layer 31 in the gravure print layer 30 on the first main surface 2a.

(9-2) Modification B

In manufacturing the insert molding decorative film 10 according to the first embodiment and the second embodiment, the second step includes the first thermal lamination step (refer to FIG. 10) and the second thermal lamination step (refer to FIG. 11 or FIG. 17).

In some embodiments, four feed rolls may be used in the second step to thermally laminate the PET film 80, the second backer film 50, the first backer film 40, and the multilayer film 20 in a single operation under heat from the heating drum 410, with the heating drum 410 in contact with the PET film 80, the PET film 80 in contact with the second backer film 50, the second backer film 50 in contact with the first backer film 40, and the first backer film 40 in contact with the multilayer film 20 on which the gravure print layer 30 is located. Unlike with the method for manufacturing the insert molding decorative film 10 according to the first embodiment, the first backer film 40 and the second backer film 50 remain separate from each other until the PET film 80 is placed in contact with the second backer film 50 for thermal lamination.

(9-3) Modification C

In the second embodiment, the screen print layer 70 is formed by screen printing on the sheet 510 resulting from the cutting. In some embodiments, the screen print layer may be formed by screen printing with roll-to-roll processing. With roll-to-roll processing, the light-transmissive patterned layer 71 is also printed on the second backer film 50 by screen printing after the PET film 80 is released. With roll-to-roll processing, the adhesive layer 72 is printed on the light-transmissive patterned layer 71 by screen printing.

(10) Features (10-1)

In the above insert molding decorative film 10, the multilayer film 20 includes the first acrylic resin layer 21, the second acrylic resin layer 23, and the first polycarbonate resin layer 22 between the first acrylic resin layer 21 and the second acrylic resin layer 23. The second backer film 50 includes the third acrylic resin layer 51, the fourth acrylic resin layer 53, and the second polycarbonate resin layer 52 between the third acrylic resin layer 51 and the fourth acrylic resin layer 53. In this insert molding decorative film 10, the multilayer film 20 and the second backer film 50 each having the multilayer structure reduce film shrinkage to, for example, ±0.15% when the gravure print layer 30 is printed and dried. This structure also has less film shrinkage in thermal lamination. This increases the dimensional accuracy of the gravure-printed graphic layer 31 and the light-transmissive patterned layer 32 or the dimensional accuracy of the gravure-printed graphic layer 31 and the screen-printed light-transmissive patterned layer 71. The multilayer backer film 60 including the second backer film 50 with the multilayer structure has a higher heat resistance. The insert molding decorative film 10 with this structure thus has less flow of gravure ink when in contact with the molten resin 290 that reaches a temperature as high as, for example, about 300° C. in manufacturing of the polycarbonate resin molded product 90. In this insert molding decorative film 10, the first backer film 40 containing an ABS-based resin reduces thermal damage to the gravure ink. Further, the insert molding decorative film 10 including the second polycarbonate resin layer 52 has a higher strength and thus has less cracking during forming of the film and during molding.

The ink flow refers to melting of the resin used for printing at high temperature.

(10-2)

In the above insert molding decorative film 10, the polycarbonate-based resin in each of the first polycarbonate resin layer 22 and the second polycarbonate resin layer 52 has a glass transition temperature of 120 to 200° C., inclusive. The first polycarbonate resin layer 22 and the second polycarbonate resin layer 52 thus each contain the polycarbonate-based resin with a high glass transition temperature. The multilayer film 20 and the multilayer backer film 60 including these layers have a higher heat resistance. The gravure print layer 30, which is between the multilayer film 20 and the multilayer backer film 60 with the higher heat resistance, has a reduced ink flow when inserted in manufacturing the polycarbonate resin molded product 90 by injecting the molten polycarbonate-based resin 290 at about 300° C.

(10-3)

The first backer film 40 in the above insert molding decorative film 10 has a specific heat capacity of $1.3 \times 10^3$ to $1.7 \times 10^3$ J/(kg·K), inclusive. The first backer film 40 having the high specific heat capacity reduces thermal damage to the gravure print layer.

(10-4)

In the above insert molding decorative film 10 according to the first embodiment, the light-transmissive patterned layer 32 may be included in the gravure print layer 30. This structure has less film shrinkage when the gravure print layer 30 is formed or thermally laminated. The light-transmissive patterned layer 32 in the gravure print layer 30 thus has higher dimensional accuracy.

(10-5)

In the above insert molding decorative film according to the second embodiment, the light-transmissive patterned layer 71 may be on the second backer film 50. In this case, the light-transmissive patterned layer 71 is formed after thermal lamination. The light-transmissive patterned layer 71 is thus unaffected by thermal lamination.

(10-6)

With the method for manufacturing the insert molding decorative film 10 according to the first embodiment or the second embodiment described with reference to FIGS. 9 to 12 or 16 to 19, the heating drum 410 (first contact heater) is in contact with the PET film 80 (release film), and the PET film 80 is in contact with the second backer film 50 in the second step (refer to FIG. 11 or FIG. 17). In other words, the second backer film 50 avoids being in direct contact with the heating drum 410. Thus, when the insert molding decorative film 10 is separated from the heating drum 410 after being thermally laminated, the insert molding decorative film 10 is pulled by the heating drum 410 with less force than when the second backer film 50 is in direct contact with the heating drum 410. This reduces distortion in the printed graphic element in the gravure print layer 30 under a force applied when the insert molding decorative film 10 is pulled by the heating drum 410.

(10-7)

The method for manufacturing the insert molding decorative film 10 according to the first embodiment or the second embodiment described with reference to FIGS. 9 to 12 or 16 to 19 includes the first thermal lamination step (refer to FIG. 10) and the second thermal lamination step (refer to FIG. 11 or FIG. 17). The lamination is performed in the multiple steps with a laminator using fewer feed rolls. In this case, the method includes an additional thermal lamination step but uses no additional PET film 80, with the first thermal lamination step (refer to FIG. 10) using no PET film 80.

(10-8)

With the above method for manufacturing the insert molding decorative film 10, the first step may include, after printing of the gravure print layer 30, heat treatment at a temperature higher than the evaporation temperature of the solvent in the gravure ink used for the gravure print layer 30. The heat treatment reduces residual solvent in the gravure print layer 30 and also reduces foam during forming of the film.

(10-9)

With the method for manufacturing the resin molded product 90 described with reference to FIGS. 2 to 7, the second backer film 50 with the multilayer structure increases the heat resistance of the first backer film 40 and the second backer film 50 (multilayer backer film 60). The gravure print layer 30 thus has a reduced ink flow in manufacturing the polycarbonate resin molded product 90 by injecting the molten polycarbonate-based resin 290 at about 300° C. The first backer film 40 containing an ABS-based resin reduces thermal damage to the gravure ink in the gravure print layer 30.

Although the first embodiment and the second embodiment of the present invention have been described, the present invention is not limited to the first embodiment and the second embodiment, and may be changed in various manners without departing from the spirit and scope of the present invention. The embodiments and modifications described herein can be combined in any manner as appropriate.

REFERENCE CHARACTER LIST 10 insert molding decorative film
20 multilayer film
21 first acrylic resin layer
22 first polycarbonate resin layer
23 second acrylic resin layer
30 gravure print layer
31 graphic layer
32 light-transmissive patterned layer
33 adhesive layer
40 first backer film
50 second backer film
51 third acrylic resin layer
52 second polycarbonate resin layer
53 fourth acrylic resin layer
60 multilayer backer film
70 screen print layer
71 light-transmissive pattern
72 adhesive layer
80 PET film (example of release film)
410 heating drum (example of first contact heater)
420 heating drum (example of second contact heater)

The invention claimed is:

1. A decorative film for insert molding to be formed in a three-dimensional shape before insert molding, the decorative film comprising:
    a multilayer film having a first main surface and a second main surface and including a first acrylic resin layer comprising an acrylic-based resin, a second acrylic resin layer comprising an acrylic-based resin, and a first polycarbonate resin layer between the first acrylic resin layer and the second acrylic resin layer, the first polycarbonate resin layer comprising a polycarbonate-based resin, the multilayer film being transmissive to visible light;
    a gravure print layer on the first main surface of the multilayer film, the gravure print layer including a graphic layer including a gravure-printed graphic element, the gravure print layer being transmissive to visible light;
    a first backer film located opposite to the multilayer film across the gravure print layer, the first backer film comprising an acrylonitrile butadiene styrene-based resin transmissive to visible light, the first backer film being transmissive to visible light;
    a second backer film located opposite to the multilayer film across the first backer film, the second backer film including a third acrylic resin layer comprising an acrylic-based resin, a fourth acrylic resin layer comprising an acrylic-based resin, and a second polycarbonate resin layer between the third acrylic resin layer and the fourth acrylic resin layer, the second polycarbonate resin layer comprising a polycarbonate-based resin, the second backer film being transmissive to visible light; and
    a light-transmissive patterned layer including a light-transmissive pattern being transmissive to visible light, the light-transmissive pattern in the light-transmissive patterned layer being located to allow visible light to pass through a predetermined portion of the graphic element in the graphic layer.

2. The decorative film according to claim 1, wherein the polycarbonate-based resin in each of the first polycarbonate resin layer and the second polycarbonate resin layer has a glass transition temperature of 120 to 200° C., inclusive.

3. The decorative film according to claim 1, wherein the first backer film has a specific heat capacity of $1.3 \times 10^3$ to $1.7 \times 10^3$ J/(kg·K), inclusive.

4. The decorative film according to claim 1, wherein the light-transmissive patterned layer is included in the gravure print layer.

5. The decorative film according to claim 1, wherein the light-transmissive patterned layer is on the second backer film.

6. A method for manufacturing a decorative film for insert molding to be formed in a three-dimensional shape before insert molding, the method comprising:
    forming, by gravure printing, a gravure print layer transmissive to visible light on a first main surface of a multilayer film, the multilayer film including a first acrylic resin layer comprising an acrylic-based resin, a second acrylic resin layer comprising an acrylic-based resin, and a first polycarbonate resin layer between the first acrylic resin layer and the second acrylic resin layer, the first polycarbonate resin layer comprising a polycarbonate-based resin, the multilayer film being transmissive to visible light; and
    thermally laminating a first backer film, a second backer film, and the multilayer film on which the gravure print layer is located, the first backer film comprising an acrylonitrile butadiene styrene-based resin transmissive to visible light, the second backer film including a third acrylic resin layer comprising an acrylic-based resin, a fourth acrylic resin layer comprising an acrylic-based resin, and a second polycarbonate resin layer between the third acrylic resin layer and the fourth acrylic resin layer, the second polycarbonate resin layer comprising a polycarbonate-based resin, the second backer film being transmissive to visible light,
    wherein the thermally laminating includes thermally laminating a release film, the second backer film, the first backer film, and the multilayer film under heat from a first contact heater with the first contact heater in contact with the release film, the release film in contact with the second backer film, the second backer film in contact with the first backer film, and the first backer film in contact with the multilayer film on which the gravure print layer is located, and
    the release film has a release strength with which the release film is released from the first contact heater after thermal lamination, and the release strength of the release film is lower than a release strength of the second backer film with which the second backer film is released from the first contact heater after thermal lamination performed with the first contact heater in direct contact with the second backer film.

7. The method according to claim 6, wherein the thermally laminating includes:
    thermally laminating the first backer film and the second backer film to form a multilayer backer film with a second contact heater in contact with the first backer film and the first backer film in contact with the second backer film, and
    thermally laminating the release film, the multilayer backer film, and the multilayer film under heat from the first contact heater with the first contact heater in contact with the release film, the release film in contact with the second backer film in the multilayer backer film, and the first backer film in the multilayer backer film in contact with the multilayer film on which the gravure print layer is located.

8. The method according to claim 7, wherein
the forming the gravure print layer includes performing, after forming the gravure print layer, heat treatment at a temperature higher than an evaporation temperature of a solvent in a gravure ink used for the gravure print layer.

9. A method for manufacturing a resin molded product, the method comprising:
forming the decorative film according to claim 1 in the three-dimensional shape;
trimming an excess portion of the decorative film formed in the three-dimensional shape; and
injecting a polycarbonate-based resin into a mold with the decorative film placed in the mold to obtain a polycarbonate resin molded product decorated with the decorative film and transmissive to visible light.

* * * * *